(12) United States Patent
Nachinson et al.

(10) Patent No.: US 6,768,483 B1
(45) Date of Patent: *Jul. 27, 2004

(54) SYSTEM AND METHOD OF PROVIDING RESTRAINED, STREAMLINED ACCESS TO A COMPUTERIZED INFORMATION SOURCE

(75) Inventors: Jon Nachinson, Flossmoor, IL (US); Richard Krebs, Cary, IL (US); Richard Watson, San Jose, CA (US); Thomas Becker, Willow Springs, IL (US); Gregory Morton, Carol Stream, IL (US)

(73) Assignee: Prosisa Overseas, Inc., Sao Paulo (BR)

( * ) Notice: Subject to any disclaimer, the term of this patent is extended or adjusted under 35 U.S.C. 154(b) by 0 days.

This patent is subject to a terminal disclaimer.

(21) Appl. No.: 09/489,482

(22) Filed: Jan. 21, 2000

Related U.S. Application Data

(63) Continuation of application No. 08/970,029, filed on Nov. 13, 1997, now Pat. No. 6,037,928.

(51) Int. Cl.[7] .......................... G06F 12/00; G09G 5/00
(52) U.S. Cl. ....................................... 345/156; 711/164
(58) Field of Search ................................. 345/112, 156, 345/157, 158, 163, 168, 169, 172, 173, 302, 326, 327, 329, 335; 341/20, 21, 22, 23; 348/13, 734; 248/118; 700/83, 84, 17; 711/163, 164

(56) References Cited

U.S. PATENT DOCUMENTS 3,956,745 A   5/1976 Ellis
4,063,232 A  12/1977 Fernald
4,460,974 A   7/1984 Jones (List continued on next page.)

FOREIGN PATENT DOCUMENTS

| CA | PCT/CA94/00184 | 3/1994 |
| EP | 0 760 568 A1 | 5/1997 |
| GB | 2019628 A | 10/1979 |
| WO | WO 98/24358 | 6/1998 |
| WO | WO 98/49813 | 11/1998 |

OTHER PUBLICATIONS

*COMPAQ Website Pages associated with "Easy Access Keyboard Internet", Number of pages 11, Website Address: http:// www. compaq.com/athome/tutorials/keyboard/index. html, Download date.

(List continued on next page.)

*Primary Examiner*—Steven Saras
*Assistant Examiner*—Paul A. Bell
(74) *Attorney, Agent, or Firm*—Mintz, Levin, Cohn, Ferris, Glovsky and Popeo, P.C.

(57) ABSTRACT

The present disclosure is directed to a system for providing restrained, streamlined access to a computerized information source. The system—which works in association with a multipurpose computer—includes a discrete article, such as an advertising specialty like a mouse pad, having facilities to receive a user input and, in turn, generate a unique predetermined signal based on the input. The system further includes software for configuring the computer to respond to each unique predetermined signal by executing one or more commands, as selected and stored within the software. Each configuration can be dynamically locked such that the commands to be executed upon the unique input are not alterable without an authorization mechanism, such as a password. The software also responds to receipt of one of the unique predetermined signals by executing the commands associated with the received signal. A method for performing same is also disclosed. This system and method have particular application in advertising a business on the Internet, facilitating access to various locations within the domain of an Internet content provider and in managing a computer network.

7 Claims, 6 Drawing Sheets

U.S. PATENT DOCUMENTS

| | | |
|---|---|---|
| 4,680,729 A | 7/1987 | Steinhart |
| 4,688,020 A | 8/1987 | Kuehneman et al. |
| 4,698,626 A | 10/1987 | Sato et al. |
| 4,763,252 A | 8/1988 | Rose |
| 4,766,418 A | 8/1988 | Dowsett et al. |
| 4,823,311 A | 4/1989 | Hunter et al. |
| 4,831,367 A | 5/1989 | Baus |
| 4,844,637 A | 7/1989 | Buisson et al. |
| 4,908,612 A | 3/1990 | Bromley et al. |
| 4,916,740 A | 4/1990 | Noda et al. |
| 4,964,075 A | 10/1990 | Shaver et al. |
| 5,146,615 A | 9/1992 | Hodsdon et al. |
| 5,181,029 A | 1/1993 | Kim |
| 5,243,331 A | 9/1993 | McCausland et al. |
| 5,341,133 A | 8/1994 | Savoy et al. |
| 5,379,421 A | 1/1995 | Palazzi, III et al. |
| 5,396,546 A | 3/1995 | Remillard |
| 5,414,422 A | 5/1995 | Allen |
| 5,450,079 A | 9/1995 | Dunaway |
| 5,481,265 A | 1/1996 | Russell |
| 5,486,846 A | 1/1996 | Comer et al. |
| 5,491,495 A | 2/1996 | Ward et al. |
| 5,493,105 A | 2/1996 | Desai |
| 5,557,701 A | 9/1996 | Krivoshlykov et al. |
| 5,557,724 A | 9/1996 | Sampat et al. |
| 5,563,630 A | 10/1996 | Tsakiris et al. |
| 5,644,338 A | 7/1997 | Bowen |
| 5,650,831 A | 7/1997 | Farwell |
| 5,673,322 A | 9/1997 | Pepe et al. |
| 5,684,951 A | 11/1997 | Goldman et al. |
| 5,699,059 A | 12/1997 | Hiller |
| 5,717,430 A | 2/1998 | Copland |
| 5,729,594 A | 3/1998 | Klingman |
| 5,781,189 A | 7/1998 | Holleran et al. |
| 5,809,143 A | 9/1998 | Hughes |
| 5,839,905 A | 11/1998 | Redford et al. |
| 5,841,115 A | 11/1998 | Shepley |
| 5,844,552 A | 12/1998 | Gaughan et al. |
| 5,854,624 A | 12/1998 | Grant |
| 5,861,881 A | 1/1999 | Freeman et al. |
| 5,867,729 A | 2/1999 | Swonk |
| 5,869,789 A | 2/1999 | Reid-Green |
| 5,870,724 A | 2/1999 | Lawlor et al. |
| 5,874,906 A | 2/1999 | Willner et al. |
| 5,880,685 A | 3/1999 | Weeks |
| 5,889,506 A | 3/1999 | Lopresti et al. |
| 5,892,503 A | 4/1999 | Kim |
| 5,895,462 A | 4/1999 | Toki |
| 5,898,919 A | 4/1999 | Yuen |
| 5,903,259 A | 5/1999 | Brusky et al. |
| 5,905,251 A | 5/1999 | Knowles |
| 5,905,493 A * | 5/1999 | Belzer et al. ............... 345/334 |
| 5,907,322 A | 5/1999 | Kelly et al. |
| 5,907,350 A | 5/1999 | Nemirofsky |
| 5,909,183 A | 6/1999 | Borgstahl et al. |
| 5,923,736 A | 7/1999 | Shachar |
| 5,926,169 A | 7/1999 | Church et al. |
| 5,926,170 A | 7/1999 | Oba |
| 5,932,869 A | 8/1999 | Gottlich et al. |
| 5,938,772 A * | 8/1999 | Welch ........................ 713/320 |
| 5,952,641 A | 9/1999 | Korshun |
| 5,964,830 A | 10/1999 | Durett |
| 5,973,666 A * | 10/1999 | Challener et al. ........... 345/146 |
| 5,995,965 A * | 11/1999 | Experton ..................... 707/10 |
| 6,002,450 A * | 12/1999 | Darbee et al. .............. 348/734 |
| 6,012,088 A * | 1/2000 | Li et al. ..................... 709/219 |
| 6,026,435 A * | 2/2000 | Enomoto et al. ........... 709/217 |
| 6,037,928 A * | 3/2000 | Nachinson et al. ......... 345/156 |
| 6,049,796 A * | 4/2000 | Siitonen et al. ................ 707/3 |
| 6,061,502 A * | 5/2000 | Ho et al. ..................... 358/402 |
| 6,087,955 A * | 7/2000 | Gray ......................... 340/5.74 |
| 6,125,287 A * | 9/2000 | Cushman et al. ........... 455/566 |
| 6,144,401 A * | 11/2000 | Casement et al. ............ 725/30 |
| 6,169,734 B1 * | 1/2001 | Wilson ....................... 370/352 |
| 6,202,212 B1 * | 3/2001 | Sturgeon et al. ............ 345/157 |
| 6,243,741 B1 * | 6/2001 | Utsumi ....................... 709/208 |
| 2001/0005199 A1 * | 6/2001 | Anderson ................... 345/168 |

OTHER PUBLICATIONS

*DARWIN Website Pages associated with "LaunchBoard", Number of Pages 14; Website Address http://www.darwin-keyboards.com/launch/htm, Download date.

*IBM Technical Disclosure Bulletin; vol. 28, No. 6, dated Nov. 1985 entitled "Programmable Function Keys".

*BM Technical Disclosure Bulletin; vol. 28, No. 4, dated Sep. 1985 entitled "Method to Provide Programmable Function Keys".

* cited by examiner

SYSTEM AND METHOD OF PROVIDING RESTRAINED, STREAMLINED ACCESS TO A COMPUTERIZED INFORMATION SOURCE

This application is a continuation of U.S. patent application Ser. No. 08/970,029, filed on Nov. 13, 1997, now U.S. Pat. No. 6,037,928, the contents of which are herein incorporated by reference.

BACKGROUND OF THE INVENTION

1. Field of the Invention

The present invention relates in general to a user input device for use in association with a computer and, in particular, to a system for providing restrained, streamlined access to a computerized information source, such as an Internet web site, software application, data file or similar source of information.

2. Background Art

Computers have become commonplace. Computer systems generally are comprised of hardware and software. The hardware generally includes a processor (actually including a central processing unit, other processing units, memory and storage devices), peripheral devices (modems, printers), a monitor, a keyboard and a mouse (or other pointing device).

The general operation and function of a mouse is well-known. Most software requires the end user to manipulate a cursor within a graphical user interface ("GUI") to select various segments therein resulting in the execution of a particular command. To accomplish this result, the mouse is moved along a frictional surface causing a roller ball within the interior of the mouse to rotate in a planar direction. This motion is translated into a series of direction signals that are fed into the computer ultimately resulting in the cursor moving in relation to the motion of the mouse on the physical surface. Once the cursor has reached a desired location on the GUI, the end user presses a button on the mouse to actuate an object associated with the cursor. Usually, end users have a mouse pad to facilitate these "mousing" operations by providing a free surface with increased friction to enhance the effect of rolling the mouse.

In addition to basic computer hardware and mouse pad, an end user may have additional hardware such as a joystick, optical scanners and other computer accessories, such as wrist supports, floppy disk cases. In particular, the computer accessories (including mouse pads) have become a frequent advertising tool, with software developers, computer manufacturers and other businesses distributing accessories imprinted with the company's trademark and the like. However, like any advertising specialty, merely getting the company's trademark in front of a potential customer and even a customer, does not ensure business from the recipient of the advertising specialty.

Accordingly, one object of the present invention is to increase the connection between the end user/recipient of an advertising specialty and the company distributing that advertising specialty.

Returning to the actual computer system itself, the software is the code that controls or manipulates the various elements of hardware to produce desired results. The most basic element of software in a computer system is the operating system. The operating system is a program that controls a computer and makes it possible for end users to enter and run their own programs.

Other software, typically called applications, define the particular uses for a computer system. Applications (and their supporting files and libraries) are resident within the computer system's storage devices and memory. Certain applications facilitate word processing, drawing, book keeping, and communication with other computers. The types of applications are almost limitless. Consequently, most computers have dozens of applications available to an end user via the computer's operating system at any one time. As a result users are often required to perform a number of steps to activate a desired application.

Once an end user has activated a desired application, within that application there are various commands that assist the end user in performing various tasks within the particular application. These commands are often triggered by selection of elements within a graphical user interface from pull-down menus, tool bars and other graphical cues using the mouse. Sometimes commands are triggered by activation of one or more keys on the keyboard. Oftentimes the keys selected for command activation are the function of "F-keys" (usually located across the top of a standard keyboard designated "F1" through "F12") alone or in combination with an easy-to-reach combination of other keys, such as the Ctrl, Alt and/or Shift keys. Activation of these F-keys (or any keys on the keyboard) generates a code which is unique for each key, along with an indication of the binary state of the Ctrl, Alt and Shift keys (i.e. active/inactive).

One particular application that has become popular recently are Internet browsers. The Internet is a network of computers, each computer having a specific, unique address. These computers are linked by communication lines. Information is passed from computer to computer until the data reaches its destination or is returned to its source. An Internet browser is an application that facilitates an end user's communication with a particular address on the Internet, particularly allowing that end user to link to and, in turn, download files that appear as graphical pages on the end user's computer allowing that end user to view and perform various tasks within that file creating the appearance that the user in performing tasks on the World Wide Web. Generally, a modem connected to a telephone line under the control of an application called a "dialer," underlies the browser to provide a connection onto the Internet via an Internet service provider. As its name suggests, a "dialer" dials a telephone number and supports continued connection of the modem to the telephone network. Alternatively, an end user may connect to the Internet via an ISDN-line, other direct Internet connection, local area network (LAN) or wide area network (WAN).

The prevalence of the Internet, modems, browsers and dialers have led to a commercial revolution on the Internet. Many businesses have developed web pages (or web sites) that provide potential and current customers with information about the business, its products and/or services, and other materials. Some web sites even provide an end user with the opportunity to purchase products, or at least determine the availability of products from the web site owners. In fact, as a conservative estimate, tens of thousands of businesses have developed web sites on the Internet to compete for the end users' time and money. Each web site is designated by an Internet address; a long series of difficult to remember numbers like "194.56.82.7." Consequently, domain names, such as "XYZ.COM." have been developed as an easier-to-remember substitute for a site's Internet address. Nevertheless, even these domain names are not always easy to remember. Furthermore, some domain names are lengthy and, thus, difficult to type. Still further, with the explosion of web sites and businesses on the Internet, competition for business is becoming more fierce. Consequently, any edge toward "bringing" a user to one web site over another is significant.

Accordingly, it is another object of the present invention to provide businesses with a fixed mechanism for facilitating a user's simplified access to a business's web site rather than another web site. It is an associated object of the present invention to provide a discrete object separate from the standard keys of a computer keyboard such that the fixing or locking of switch does not diminish the full functionality of those standard keys.

In the workplace, in addition to the public Internet, local area networks (LANs), wide area networks (WANs), intranets, extranets and other proprietary networks have become popular. In effect, LANs and WANs provide a company with its own internal Internet. In fact, when the computers within such a LAN or WAN are connected using Internet-like protocols such a configuration is referred to as an "Intranet." Whether a LAN or WAN is an intranet or not, these private networks provide a group of users with improved communication and access to the accumulated knowledge of the group, thus making the group more productive. This productivity is directly related to the users' ability to find information and obtain assistance in utilizing this relatively new technology. Unfortunately, as LANs and WANs develop within a business, files must be moved and hardware reconfigured. Thus, requiring frequent change in the commands required to access any particular set of information and consequently diminishing the usefulness of the network and the productivity of its users.

Accordingly, it is another object of the present invention to circumvent the need for users to "know" locations for information within such a network.

Other objects of the present invention will become obvious in light of the present specification, drawings and claims.

SUMMARY OF THE DISCLOSURE

The present disclosure is directed to a system for providing restrained, streamlined access to a computerized information source. This system is used in association with a multipurpose computer.

The system includes a discrete article operably connected to the multipurpose computer. This discrete article, which may comprise an advertising specialty such as a mouse pad or wrist rest, includes means for receiving a user input. This user input means may comprise one or more switches disposed on the surface of the discrete article. It is also contemplated that the discrete article may comprise a microphone. In either event, the discrete article contains means for generating one or more unique predetermined signals based on the user input. These unique predetermined signals are input into the multipurpose computer.

The system further resides in configuring the multipurpose computer to respond to each of the one or more unique predetermined signals by executing one or more commands. This configuring means includes means for selecting the commands to be executed upon receipt of a respective one of the unique predetermined signals. Also included is means for storing each of the commands selected in association with the respective one of the unique predetermined signals as a portion of a set of switch data. The configuring means further includes means for dynamically locking at least one of the pieces of switch data, such that the commands stored there within are configurable by a user in association with an authorization mechanism, such as a password.

The system additionally includes means for responding to receipt by the multipurpose computer of one of the unique predetermined signals. This means executes the commands stored in the switch data in association with said received one of said one or more unique predetermined signals.

The system may also include means for encouraging a user to connect the discrete article to the computer. In one embodiment, this encouraging means resides in ensuring that some of the switches or other means for user input are not locked such that said user is permitted to configure at least some of the responses.

This system is particularly useful where the multipurpose computer is operably connected to the Internet. In such a case, the switch data includes at least one set of commands that links said multipurpose computer to a predefined address on the Internet. In a preferred embodiment, this Internet link is locked by the locking means, such that said user cannot alter said one or more commands and said predefined address. Thus, where the discrete article is an advertising specialty including an indicia associated with a business and that business has an address on the Internet, user input of the associated unique predetermined signal will cause said multipurpose computer to respond by linking to the business's Internet site.

The system may further include means for overwriting switch data with new switch data. Where the multipurpose computer is operably connected to a computer network, this new switch data may be located elsewhere on the computer network and leads to consistent operations across the computer network.

The present disclosure also discloses a method for providing restrained, streamlined access to a computerized information source, said method comprising: connecting a discrete article to a multipurpose computer in operable fashion; configuring the multipurpose computer to respond to one or more unique predetermined signals; locking one or more of the configured responses to the one or more unique predetermined signals; generating one of the one or more unique predetermined signals with the discrete article; and responding to receipt of one of the one or more unique predetermined signals based on the configuration of the multipurpose computer associated with the generated one of the one or more unique predetermined signals.

The method may further comprise the steps of printing an indicia on the discrete article, the indicia including information associated with a business; and providing the discrete article to the user. The method may additionally include step of configuring the multipurpose computer to respond to one or more unique predetermined signals comprises configuring the multipurpose computer to link to an Internet address associated with the business.

BEST MODES FOR CARRYING OUT THE INVENTION

Figure 1:
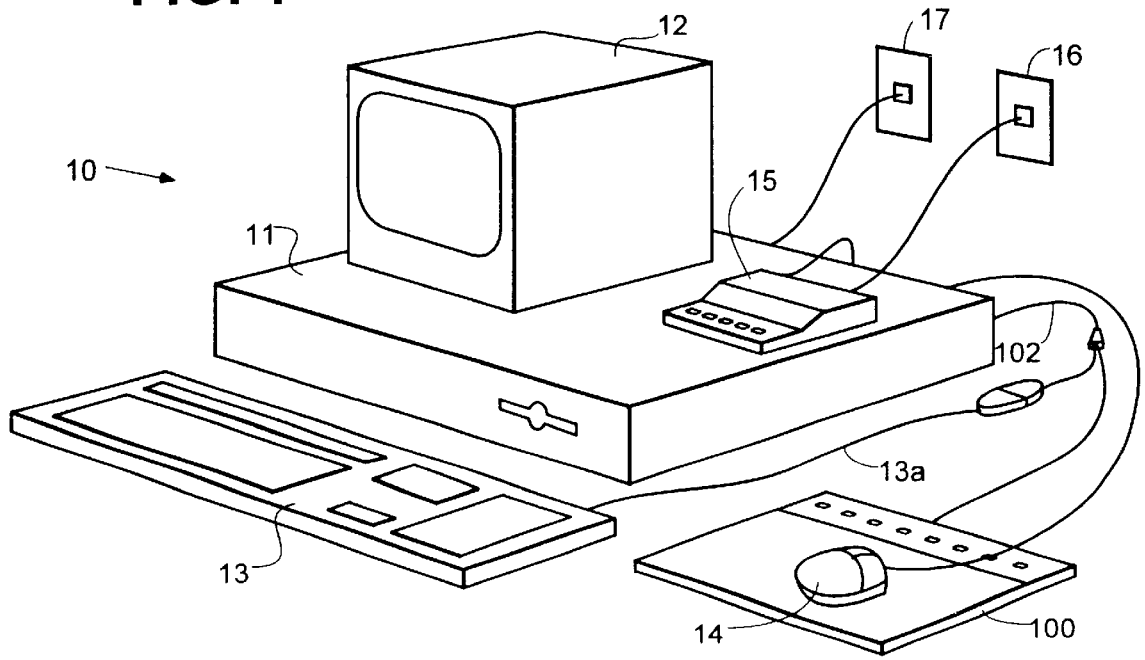
FIG. 1 of the drawings is a plan view of a computer system including the present system and method for providing restrained, streamlined access to an information source.

While this invention is susceptible of embodiment in many different forms, there is shown in the drawings, and will herein be described in detail, a number of embodiments, with the understanding that the present disclosure can be considered as an exemplification of the principles of the invention and is not intended to limit the invention to the embodiments illustrated.

FIG. 1 shows computer system 10 which includes a standard multipurpose computer 11 and monitor 12, keyboard 13, mouse 14 and modem 15 each of which are operably connected to multipurpose computer 11 in well-known fashion. Multipurpose computer 11 may be a PENTIUM® based computer or any other multipurpose computer operating under an operating system such as WINDOWS® 95, WINDOWS® NT, System 7 from Apple Computer Corporation of Cupertino, Calif. or UNIX to name a few. Monitor 12 may be a standard SVGA monitor or other display unit. Keyboard 13 may be a standard 101-key keyboard having a numeric keypad and various function or F-keys. Modem 15 is connected to the Internet via phone jack 16. Although modem 15 is shown as being external, it is contemplated that modem 15 could also be an internal modem or that the connection to the Internet may be via a dedicated connection. Additionally, in certain configurations, multipurpose computer 11 may contain a network interface card that connects computer 11 to a LAN or WAN in a manner well-known in the art via network connection 17. As is known, connection to the Internet can also be achieved via a LAN or WAN (via the network interface card) without the use of modem 15.

Figure 1A:
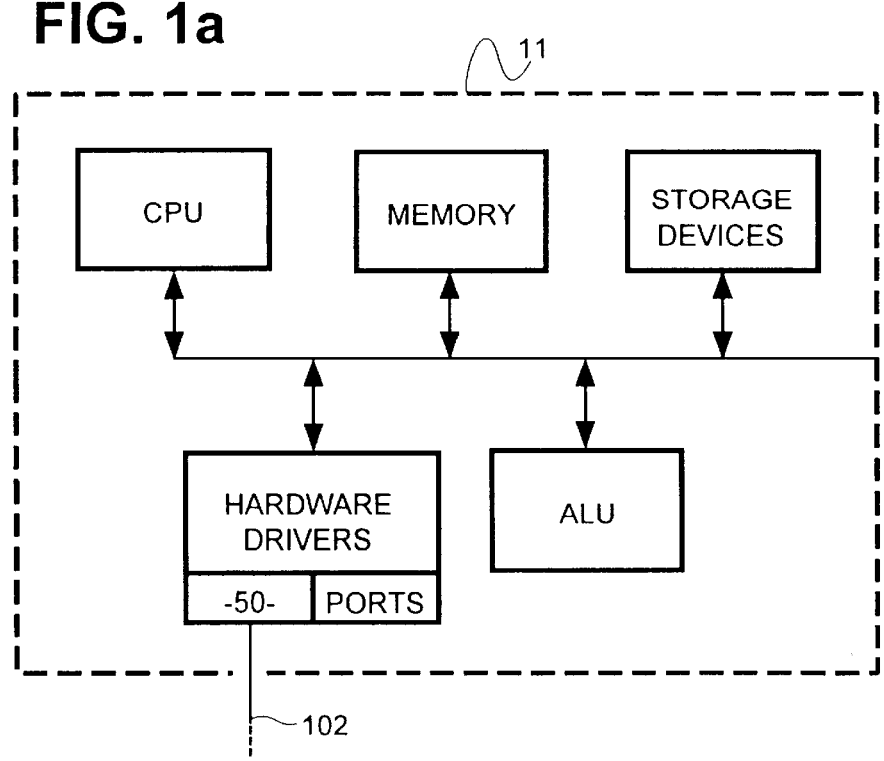
FIG. 1a of the drawings is a schematic block diagram of a computer utilized within the present system and method for providing restrained, streamlined access to an information source.

As shown in FIG. 1a, multipurpose computer 11 contains a CPU, ALU, memory, storage devices and other hardware drivers. As is well-known in the art, those components cooperate to execute instructions, manipulate data and run various sets of computer code, including the operating system and one or more applications.

Figure 4:
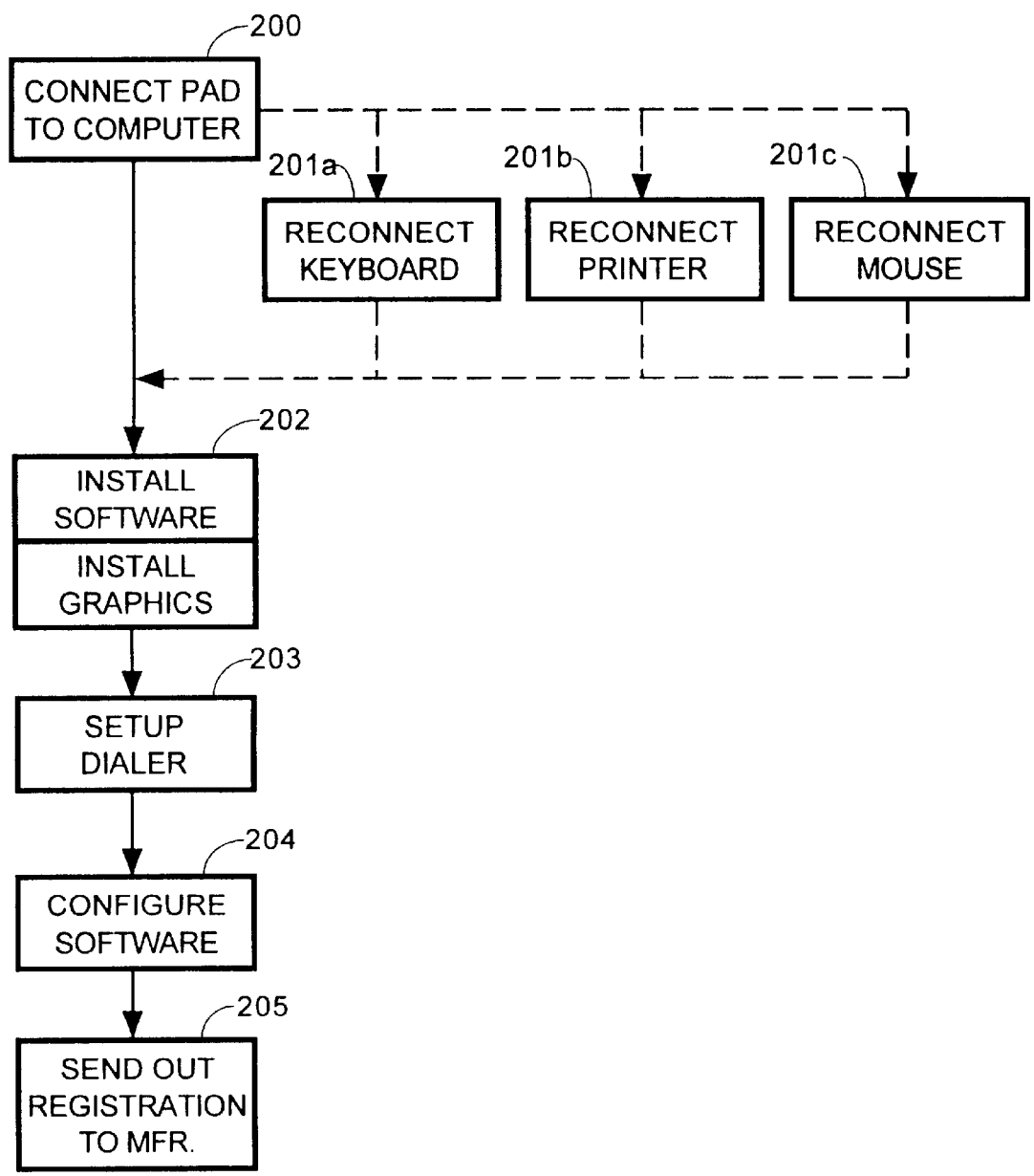
FIG. 4 of the drawings is a flow chart of the procedure for installing the present system for restrained, streamlined access to an information source within an existing computer.

FIG. 1 also shows mouse pad 100 which is one portion of the present system for restrained, streamlined access to an information source. Other discrete articles such as wrist pads, paper weights, coasters and other objects may be used in place of mouse pad 100, as would be understood by those having the present specification before them. The other element of this system is software 101 which is contained within the memory and/or storage devices of multipurpose computer 11. The procedure for installing the present system for restrained, streamlined access to an information source is shown in FIG. 4 of the drawings.

Figure 2:
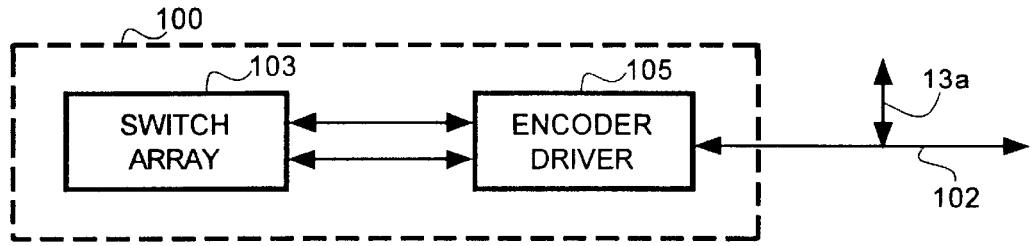
FIG. 2 of the drawings is a schematic block diagram of the circuitry within the mouse pad portion of the present system for restrained, streamlined access to an information source.
Figure 6:
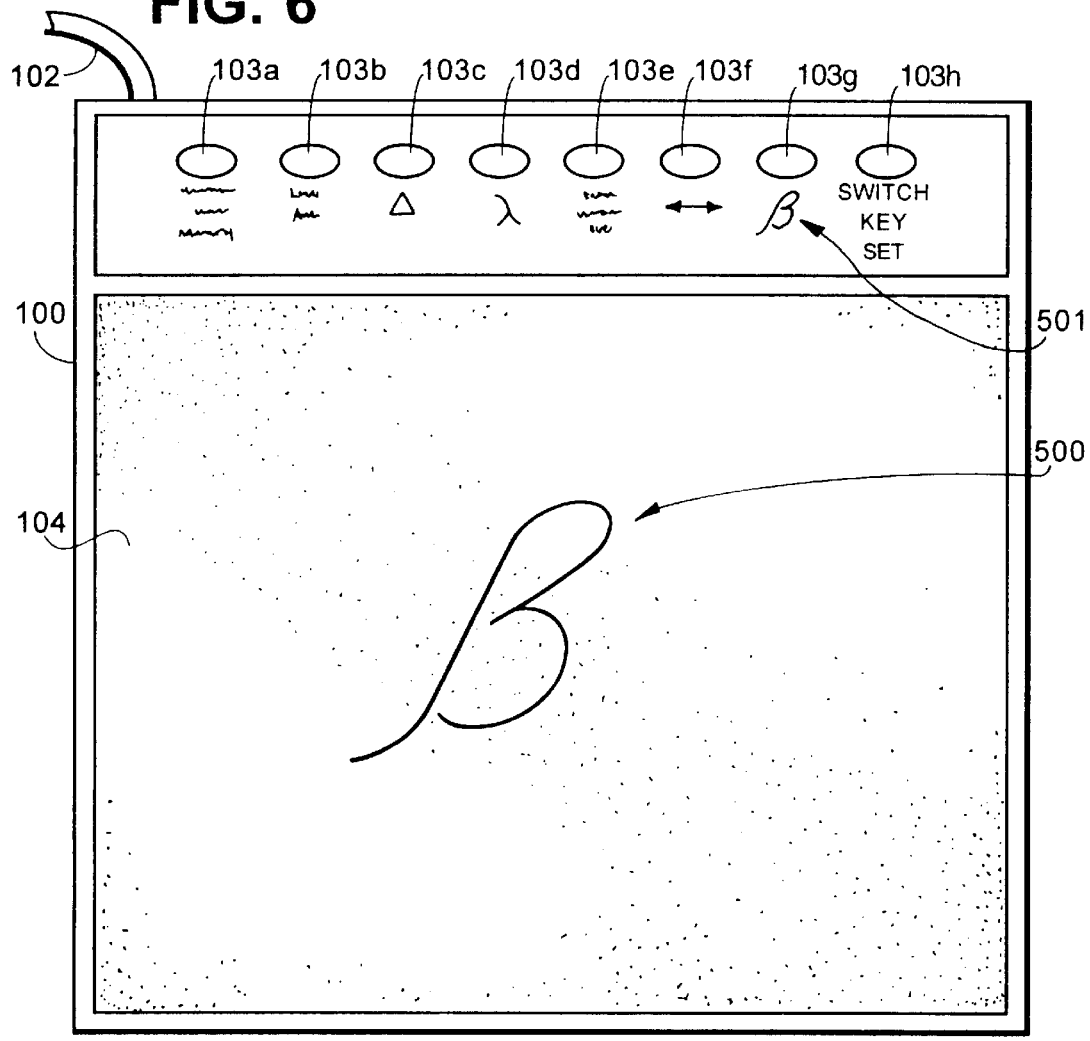
FIG. 6 of the drawings is a top plan view of the mouse pad portion of the present system for restrained, streamlined access to an information source.

First, mouse pad 100 is connected to multipurpose computer 11, step 200. As shown in FIG. 6 of the drawings, mouse pad 100 includes platform 101, communication line 102, switches 103a–h, and friction pad 104. As shown in FIG. 2, platform 101 has contained therewithin circuitry for scanning and driving switches 103a–h (designated only as switch array 103). Of course, it is within the scope of the present invention to construct mouse pad 100 with any number of switches. In a preferred embodiment, these switches are mechanical momentary contact switches, however, use of other types of switches, including, but not limited to membrane switches, capacitive switches, LCD touch switches and all types of mechanical toggle switches is contemplated.

As was the case in the prior art, friction pad 104 of mouse pad 100 may be imprinted with an indicia 500 using conventionally known printing techniques. Indicia 500 may be the logo or trademark of a particular company that in turn distributes the mouse pad to customers and prospective customers. In addition to indicia 500, mouse pad 100 also has printed thereon indicia 501 which corresponds to indicia 500 in some logical manner. Indicia 501 may be printed adjacent one of switches 103a–h, such as switch 103g, as shown in FIG. 6. The other switches may be identified by the user writing on the surface adjacent each switch. This surface may be comprised of dry-erase material to facilitate relabeling of switches as the user's needs change, which the user would write on using a dry-erase marker.

Mouse pad 100 is electrically connected to multipurpose computer 11 via communication line 102. As shown in FIGS. 1 and 1a, multipurpose computer 11 contains a plurality of communication ports through which multipurpose computer is connected to its peripheral devices, such as a modem, keyboard, mouse and a printer (not shown). In a preferred embodiment shown in FIG. 1a, mouse pad 100 is connected to communication port 50 (for simplicity the other ports are not shown).

Communication port 50 may be bi-directional or merely an input port to multipurpose computer 11. In a preferred embodiment of the invention, communication port 50 is the standard keyboard port, however a standard mouse port, a parallel port, infrared (IR) port, other wireless or a serial port may be used. It is alternately contemplated that communication port 50 may be disposed on a proprietary expansion card dedicated for purposes of the present system for restrained, streamlined access to an information source. The function and structure of such a dedicated card would be easily understood by those skilled in the art having the present specification before them.

In a preferred embodiment, the electrical connection to multipurpose computer 11 via communication lines 102 also provides power to mouse pad 100 toward powering switch array 103 and encoder/driver 105. It is alternatively contemplated that mouse pad 100 could have a separate connection to AC mains power, which would also require the addition of a transformer and TTL or ECL-level voltage regulator in association with mouse pad 100.

Depending upon which port of multipurpose computer 11 is used to connect mouse pad 100, one of keyboard 13, the printer or mouse 14 may have to be reconnected to communication port 50, steps 201a, 201b, 201c, respectively. As shown in FIG. 1, where mouse pad 100 is connected to the keyboard port of multipurpose computer 11, as is the case in a preferred embodiment of the present invention, keyboard 13 must be reconnected to the port via communication line 102 of mouse pad 100.

In a preferred embodiment, the signals of keyboard 13 are "wired-or'ed" with the signals of mouse pad 100. Other means for connecting two signal sources to a single input, such as multiplexing may be used in place of the "wired-or" configuration with some additional complexity. Thus, signals from switch array 103 of mouse pad 100 and keyboard 13 are intermixed on the same input to multipurpose computer 11. To facilitate this configuration, switch array 103 is preferably configured in a column-row matrix of ease of scanning for switch actuation. As is known, encoder/driver 105 using time-division multiplexing sequentially drives the rows and columns and senses the resulting signal toward sensing a unique switch actuation. Upon detection of a switch actuation encoder/driver sends an encoded signal to multipurpose computer 11 via communication line 102. In a preferred embodiment, this code comprises the state "shift+alt+ctrl" and the code:

| SWITCH | 103a | 103b | 103c | 103d | 103e | 103f | 103g | 103h |
|---|---|---|---|---|---|---|---|---|
| scan code | 3B | 3C | 3D | 3E | 3F | 40 | 41 | 42 |

These scan codes are the standard ASCII scan codes for the F-keys on keyboard 13. However, the accompanying state was chosen particularly because it is highly unlikely that an end user could ever inadvertently and simultaneously actuate those keys. Similarly, it is highly unlikely that any other application would include a command that requires this combination of keys to be actuated by the user. Thus, this encoding format is easily identified as being generated by mouse pad 100 rather than from keyboard 13 and is still within the "range" of a standard keyboard encoding scheme. The particular disclosed values provide only one of a number of possible switch encoding schemes that will prevent interference by switch array 103 with the proper operation of keyboard 13 and provide a unique code for switches 103a–h. Other equally effective encoding schemes may be adopted without departing from the scope of the present invention.

Following physical connection of mouse pad 100 to multipurpose computer 11, the end user installs software portion 101 of the present system for restrained, streamlined access to an information source, step 202. In a preferred embodiment of the system, software installation will not fully execute unless mouse pad 100 is electrically connected to computer 11, as determined by requesting the end user to depress one or more of switches 103a–h and waiting for receipt of the code assigned to that switch. Installation may involve insertion of one or more floppy disks or a CD-ROM into multipurpose computer 11 and execution of a command that launches an install program. This install program is specific to the installation of the present system. Like in a preferred embodiment of the present invention, this install program may be developed with the INSTALLSHIELD program available from InstallShield Corporation of Schaumburg, Ill. It is also contemplated that software portion 101 may be downloaded into multipurpose computer 11 via communication line 102 from the mouse pad (as loaded in an EEPROM or other similar device within the mouse pad), via network connection 17 from a computer network or even from a web site on the Internet. In either case, in one embodiment of the present invention, this download would be prompted by physical connection of mouse pad 100 to multipurpose computer 11. In such a case, mouse pad 100 would include an executable file that prompts the download to occur. In yet another embodiment, the software download may be prompted by a network administrator via a network connection.

Figure 3:
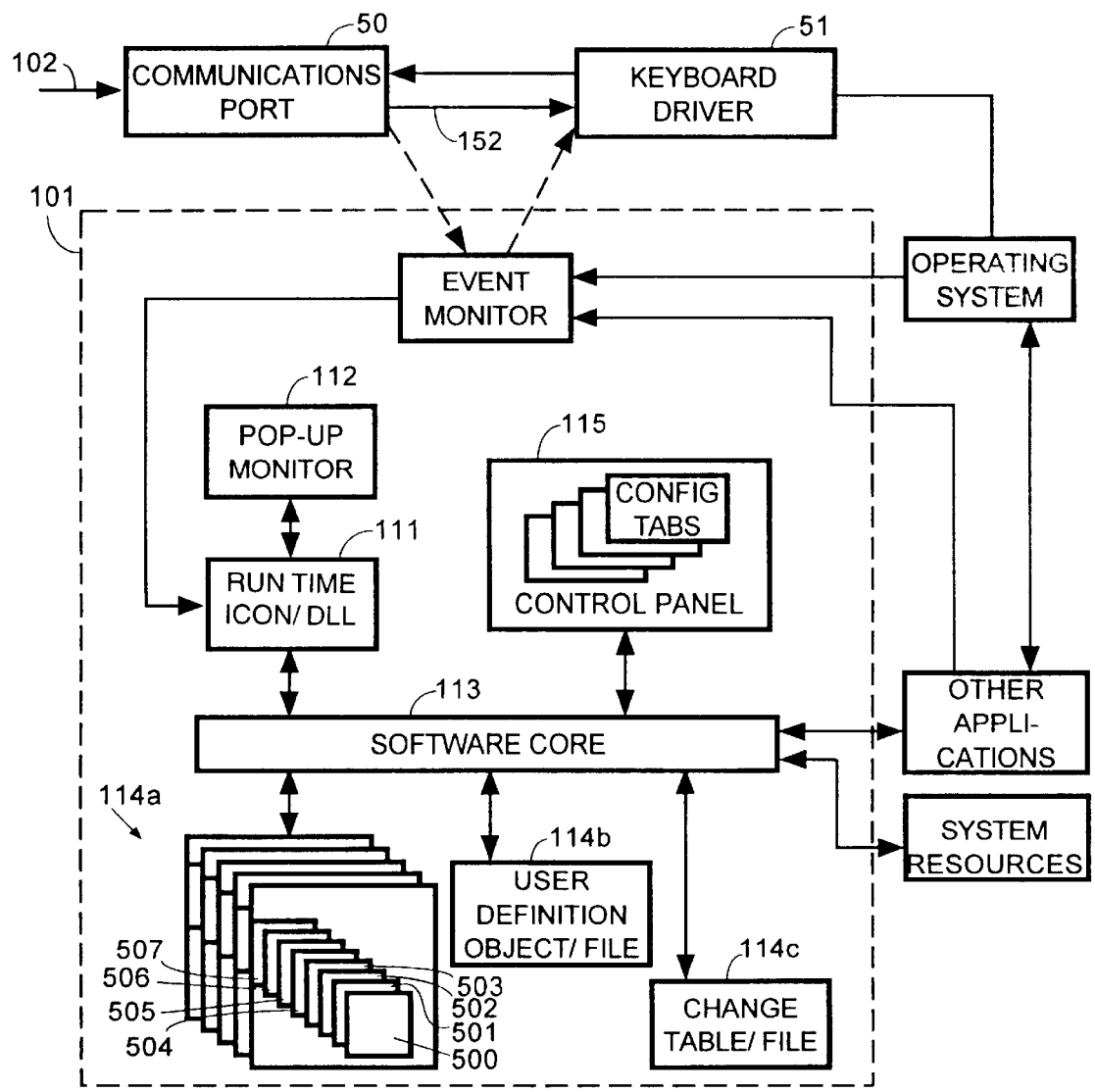
FIG. 3 of the drawings is a schematic block diagram of the software and computer hardware portion of the present system for restrained, streamlined access to an information source.

FIG. 3 of the drawings shows a schematic block diagram of the software and computer hardware portion of the present system for restrained, streamlined access to an information source. In particular, software 101 includes ancillary keyboard driver 110, run-time DLL 111, pop-up monitor 112, application 113, various data files 114a, 114b and 114c and a control panel 115.

In installations of the present system using a modem connection, the configuration routine sets up a dialer program within the storage devices of computer 11 for use by software 101, step 203. A "dialer program" is code that controls modem 15 with a specified set of parameters and telephone numbers. In one embodiment of the present invention, a simplified dialer is included with installed software portion 101. Alternatively, software 101 can copy a pre-existing dialer program (such as MICROSOFT DIALER by the Microsoft Corporation of Redmond, Wash.) from the storage devices of multipurpose computer 11 and integrate that copy for use by software 101. Similarly, in installations,associated with the Internet, an intranet or extranet, the configuration routine locates a preexisting browser program within the storage devices of computer 11 toward integrating same with software 101. Most browser programs operate identically to accept Internet addresses from external sources, thus, facilitating this integration. The end result of this integration will facilitate Internet-type access by the end user of the device, as will be discussed in more detail hereinbelow.

After software 101 is loaded into computer 11 it must be configured to operate within that computer, step 204. As this novel system is intended to be active during each and every session on computer 11 for the entirety of that session, this configuration should include a link to software 101 that loads software 101 on each power-up of computer 11 after the operating system loads all of the requisite hardware drivers for operation of computer 11.

The configuration routine additionally loads a home set of definitions for operation of switches 103a–h on mouse pad 100 in conjunction with multipurpose computer 11. This home set of switch definitions is configured by the manufacturer or other entity. As will be more fully discussed hereinbelow, this home set of switch definitions may include one or more "locked" definitions that serve to direct the end user to a particular information set either on a computer network or the Internet.

The configuration of software 101 may also involve the identification of a path for location of the set of switch definitions. This will particularly be the case on computer network (such as LAN and WAN) installations, where the network administrator may desire control over the action of one or more switches across an entire group of LAN or WAN users. In particular, by directing each WAN or LAN user to a single file path and a single set of switch definitions, software 101 facilitates direction by the network administrator of the LAN or WAN users to a file server, communications service, text or executable file or other type of information that may be re-addressed or re-defined within the LAN or WAN. This functionality will simplify the tasks involved with network administration, by allowing the modification of a single switch set definition file that affects all of the users on a network via mouse pad 100 and software 101. A reseller or manufacturer of the present system may also take advantage of this functionality by remotely reconfiguring various switch definitions by e-mailing or otherwise distributing an updated set of switch definitions. In one embodiment, this functionality may be further facilitated by the system identifying itself upon linking to the reseller or manufacturer's web site as being equipped with the present inventive system.

In a preferred embodiment, the configuration routine will also create various icons, program groups, a de-installer, a readme file and the user interface. Further, in some embodiments, the configuration routine may also load optional animation graphics to enhance the graphical characteristics associated with operation of the inventive system.

At some point during the installation and/or configuration of software 101, the end user may be asked to provide serial numbers and demographic information toward registering their installation of the system. The information requested may include system configuration information (including dialer-type, modem-type, browser-type, type of programs installed on multipurpose computer 11, etc.), which may also be obtained directly from the operating system to facilitate technical support from the system manufacturer. The obtained registration information may be electronically transmitted to the apparatus manufacturer as e-mail or direct link with the manufacturer's computer system via modem 15 or network connection 17. In one embodiment of the present invention, this information may be additionally provided to a distributor or other entity associated with the distribution, configuration and/or manufacture of mouse pad 100 and software 101 toward providing information regarding the end user and installation of the product. The registration information may additionally or alternatively be printed out for hard-copy transmission to the manufacturer and/or maintained in a registration file within storage devices of computer 11.

After the registration information has been completed, the user would be prompted to authorize the download of the registration information, step 205. In some embodiments, this information is e-mailed via the Internet. In other embodiments the information is directly sent to a specified telephone number. In embodiments that directly download registration information, once the dialer is set up and browser located, the predefined number for direct registration would have previously been loaded into the dialer. As noted above, this number may be for the manufacturer of the system or another company involved in distribution of the equipment and software.

Once installation has been completed, the end user will be prompted to re-start computer 11 to ensure that the memory-resident code required for operation of the present system has been properly invoked. Computer 11 will restart as it did prior to the installation of software 101 by configuring the computer system and verifying its operations. Then, the operating system will be loaded into memory. After loading the operating system, software 101 is loaded and its operation begun.

Figure 7:
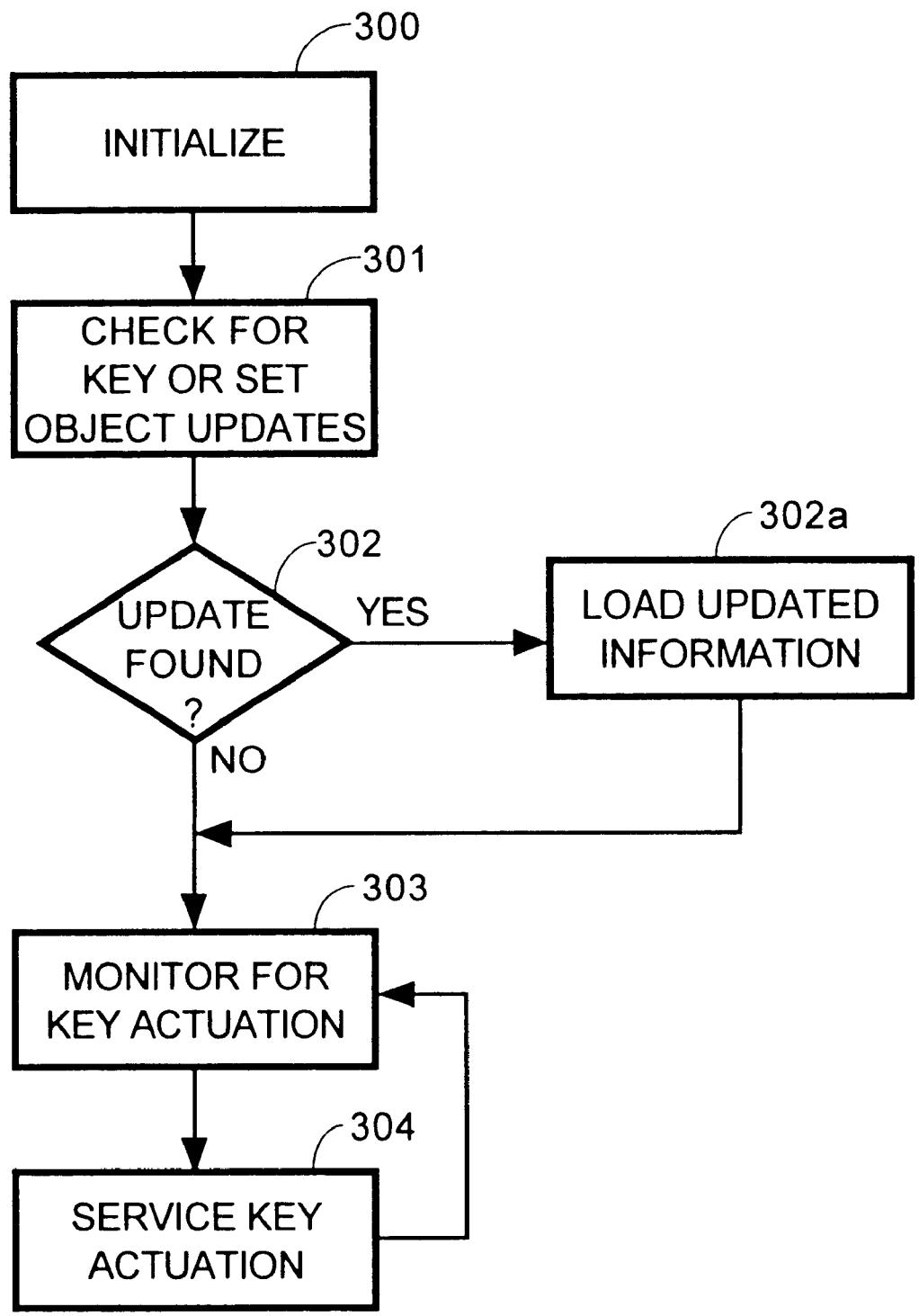
FIG. 7 of the drawings is a flow chart of the procedure for standard operation of the present system for restrained, streamlined access to an information source.

As shown in FIG. 7, software 101 begins by initializing the system, step 300. This initialization step includes invoking software 101 and powering up mouse pad 100. FIG. 3 shows the interrelation of software 101 with other software and drivers running on computer 11. As shown in FIG. 3, software 101 receives data related to event via event monitor 110. In one embodiment, event monitor 110 may be interposed between communications port 50 and keyboard driver 51 breaking the standard connection (shown by dashed line 52). In a preferred embodiment, event monitor 110 registers a pre-determined set of "event" codes with the operating system using a pre-existing command that directs any instance of the pre-determined codes to event monitor 110. In either embodiment, to ensure correct operation it is critical that software 101 be loaded prior to any other software that may cause a conflict within multipurpose computer system 11. As would be understood by one or ordinary skill in the art, loading software 101 after start-up may also work but with some risk of a conflict between the functionality of other software and one or more of the switches.

In a preferred embodiment, data from mouse pad 100 received via communication line 102 has the state encoded by encoder/driver 105 in mouse pad 100 with the "mouse pad state code" (i.e. shift+alt+ctrl). Upon detection of the mouse pad state code, the operating system redirects the associated data (or the event monitor will intercept the data) to Run Time DLL 111, which makes software calls to pop-up monitor 112 and software code 113, as necessary to facilitate handling of the particularly depressed switch from switch array 103 of mouse pad 100. Standard operation will be discussed hereinbelow. Accordingly, during the initialization step, these pieces of code must also be loaded and made active.

Following the initialization step, software code 113 checks for configuration updates, step 301. As noted above, a network administrator may configure software 101 to a file location within the storage device of computer 11 or on an associated LAN or WAN. If the end user's local configuration file 114*b* is not current to the global file, the global file is downloaded to the local configuration file and an update log register is updated with the date of the update, step 302. It is also contemplated that a similar function may be desired by the manufacturer or system integrator.

At this point, software 101 fades into the background and continually monitors for the actuation, of, one of the switches in switch array 103, step 303. This step is facilitated by event monitor 110, which will pass the data associated with such a switch actuation on mouse pad 100 to run time DLL 111 for further processing. As is known in the art, depression of switches on mouse pad 100 will be viewed as an "event" by the operating system of multipurpose computer 11. It is contemplated that events other than switch depressions may be utilized within this system. One such event may be prompted by voice recognition software in conjunction with a microphone. The voice recognition software could be configured to output codes similar to that of switches 103*a–h* or other codes that are programmed into event monitor 110. Another event may be prompted within the execution of another file or program generating other pre-determined codes that would result in action by software 101. The particular actuated switch or other unique event is serviced according to its configuration, step 304.

Figure 5:
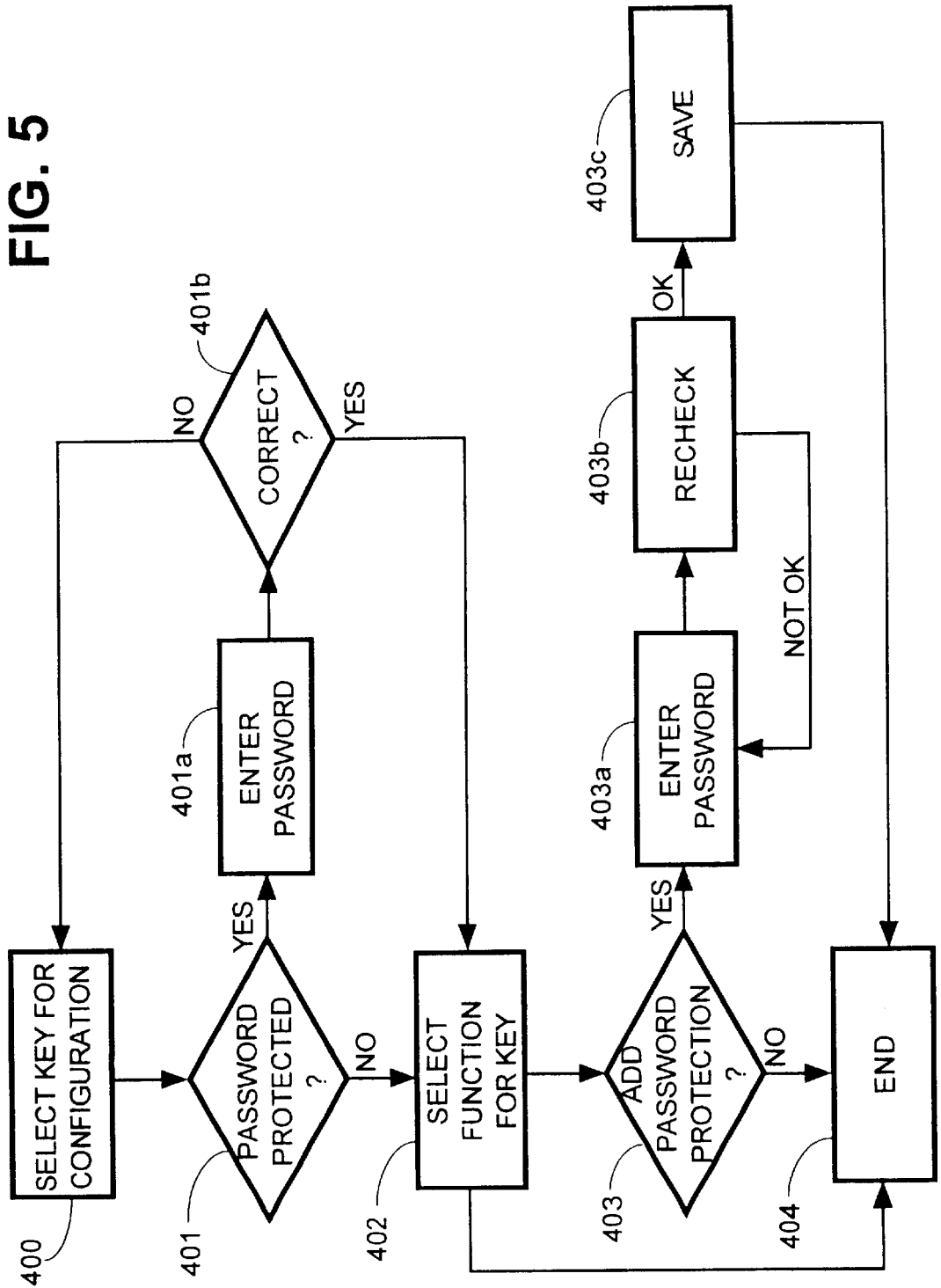
FIG. 5 of the drawings is a flow chart of the procedure for configuring the operations of the present system for restrained, streamlined access to an information source.

Each switch 103*a–h* on mouse pad 100 is configured to facilitate streamlined access to a particular set of information or an operation. For instance, actuation of a switch may include consistently launching an application, launch a shortcut or alias, launch a document (with associated application), execute a macro or series of keystrokes, visit an Internet web site, or log into a network server among other, possible operations. The manner of configuring each of these switches may be understood with reference to FIG. 5.

First, one of switches 103*a–h* must be selected for configuration, step 400. Such selection may be accomplished by pressing a previous undefined one of switches 103*a–h* on mouse pad 100 or selecting a graphical representation of one of switches 103*a–h* as it appears on control panel 115 using mouse 14 in a well-known manner. Of course other methods for selecting a particular switch, such as typing in a unique identifier associated with a switch and other well known user input operations are also within the scope of the present invention, understanding that the methods disclosed herein are for illustrative purposes only.

With a switch selected, software 101 determines if that switch is password protected, step 401. If it is password protected, only a user with the proper password can configure the switch, steps 401*a* and 401*b*. In a preferred embodiment of the present invention there is a password hierarchy having the following descending order of power: manufacturer, OEM, system integrator, system administrator and end user. In other words, the manufacturer's password overrides all other passwords on the system and so on and so forth.

If the switch is not password protected or the user has the password, then the user is prompted to select a function for the switch, step 402. These functions may include, among other options, consistently launching an application, launching a document (with associated application), launching a shortcut or alias, executing a macro or series of keystrokes, or visiting an Internet web site. The user may be provided with various dialog boxes to assist in the configuration of the switch to perform the desired function. In a preferred embodiment, where the end user instructs software 101 to configure a particular switch to launch an application, the user will be prompted with a list of available applications found within computer 11. In another example, where the user instructs software 101 to configure another switch to direct computer 11 to visit an Internet web site, the user will be prompted with a list of the sites found in the "bookmark" section of the Internet Browser. Of course, in either example, the end user would also be provided with the option of typing from keyboard 13 the name of an executable file or URL, as the case may be.

In a preferred embodiment of software 101, the assignment of a function to a switch will result in a predetermined number of characters from the executable file name, icon title and/or URL being assigned a text identifier for that switch. In some embodiments, it will be possible for the end user to change the switch identifier by selecting the automatically generated identifier and typing a replacement title via keyboard 13, in a manner commonly performed within software programs. In an embodiment allowing the end user to have such control, after assignment of a function (and identifier) to the selected one of the switches, the end user may be offered the option of adding password protection to the switch configuration, step 403. If the user indicates a desire for such protection, software 101 prompts for a password, verifies the password and saves the new password toward protecting the configuration of the particularly selected switch, steps 403*a–c*. Then the configuration routine ends. Of course, the user may configure as many keys as the end user has access to by beginning the configuration process again.

The results of this configuration routine are written into a switch object, such as switch object 500 (shown in FIG. 3). Various switch objects are grouped and organized in a specifically addressable manner. Eight switch objects (i.e. 500–507) are grouped into a switch set. The number of switch objects grouped into a switch set should equal the number of switches in switch array 103 on mouse pad 100. As shown in FIG. 3, in a preferred embodiment, there may also be two or more switch sets supported by software 101.

In such an embodiment, one of switches 103*a–h* in each switch set will be dedicated toward toggling from one set to the next set in circular fashion through each and every one of the sets and then back to the home set (i.e. the initial set from the initialization of software 101). The switch set that is currently in focus will determine the functionality of switches 103*a–h* on mouse pad 100. It should be noted that even in a configuration having multiple switch sets, it is possible to bind the end user to one or more switch sets, precluding access to the others without a requisite password.

In a preferred embodiment of the software, the end user is provided with the ability to configure other aspects associated with actuation of a switch, such as assigning a sound or animation. Additionally, software 101 may also facilitate the end user copying the configuration of one switch to another, moving a switch configuration from one switch to another, deleting the configuration of a switch and/or modifying the configuration of a switch. Such operations would be conducted via the graphical user interface or monitor 12 using keyboard 13 and/or mouse 14. As before, if a switch configuration would be modified by the operation and that switch is password protected, software 101 will prompt the end user for that password before completing the operation.

Figure 6A:
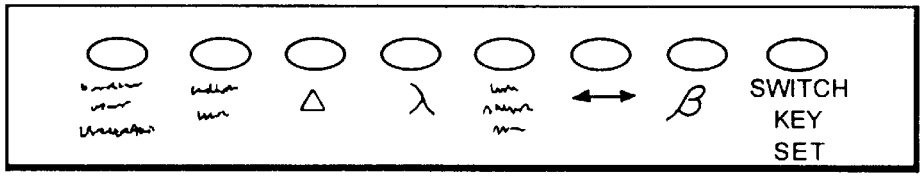
FIG. 6a of the drawings is a top plan view of an optional template for use in combination with the mouse pad of the present system for restrained, streamlined access to an information source.
Figure 6B:
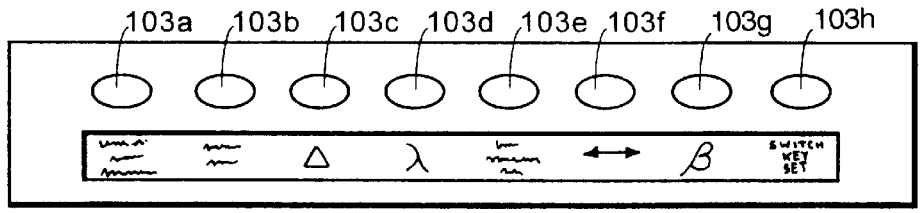
FIG. 6b of the drawings is a top plan view of the top portion of a mouse pad with a display in registration with the integrated switches for use in one embodiment of the present system for restrained, streamlined access to an information source.

FIG. 6*a* of the drawings shows an optional template for use in combination with switches 103*a–h* on mouse pad 100. In particular, this template can be made of transparent, dry-erasable material to facilitate the end user writing the switch assignments for each switch set. The template can be removed and replaced with another template as the switch set focus is changed during the course of the session. Alternatively, FIG. 6*b* of the drawings shows a display in registration with switches 103*a–h*. In one embodiment, the display is a liquid crystal display and is driven by a display driver within computer 11 via communications port 50, which—for this embodiment—would necessarily have to be bi-directional. Display 502 shows the switch identifier or another graphic that is identified during the switch configuration process. In an embodiment allowing multiple switch sets, the identifiers and graphics associated with the "in focus" are displayed. In this manner, use of the present system is further enhanced and simplified.

One major application for the foregoing system is in more effectively marketing and/or advertising a business or other entity. Oftentimes these entities and businesses purchase advertising specialties, such as mouse pads, wrist rests, paper weights, handheld calculators, clocks imprinted with various indicia, such as the company's trademark, logo, and/or other information regarding the business and its products/services for distribution to potential and current customers. In the case of mouse pad 100, friction mat 104 may be imprinted with various indicia, such as indicia 500. While these mouse pads do effectively put an advertiser's message before a consumer in a prominent location, there is nothing inherently steering the consumer to do business with the printed advertiser.

Connecting the end user/potential consumer to the advertiser in an active link would make it much more likely that the consumer will shop with the advertiser. Using the foregoing system, in addition to printing indicia 500 on mouse pad 100, an advertiser would define a set of switches that would include at least one switch defined to visit the advertiser's Internet web site (launch the dialer, the browser and load a domain name (or URL) selected by the business). This switch object definition would then be locked with a password, thus ensuring continual access to the advertiser's web site. An indicia 501, which corresponds in some manner to the advertiser's and/or indicia 500 would be printed in registration with the switch that has been defined to visit the business on the Internet. As is known, this Internet web site may contain additional advertisements and even a system for placing an order directly with the advertiser. Even if the Internet web site does not provide a means for shopping, the added advertising dimension may nevertheless make the marketing effort more productive for the business. It is believed that as a result of the user always having streamlined access to the business's web site (an information source), it is more likely that the consumer will not only think of the advertiser, but also purchase goods or services from that advertiser.

In a preferred embodiment, the number of switches that would be password locked by the advertiser is limited. In this way, additional programmable switches remain for the end user to program, such that the user receives a personal benefit from connecting mouse pad 100 and installing software 101. This added value to the consumer will almost ensure the advertiser that the end user will connect the system in a functional manner. The side effect of this connection is the provision of a quick link to the business's web site.

Another major application for the foregoing system is facilitating access to various locations on a LAN and/or WAN. In particular, by utilizing the switch locking capabilities of the system in combination with the update function, a network administrator can define various switches on mouse pad 100 to launch various company applications (e.g. scheduling, e-mail, groupware applications), documents, and logons to various servers. Through the capabilities of the present inventive system, any network configuration changes can be placed in a general file on the network in the path known to software 101 to contain switch set data. Upon initialization of a network user's computer, software 101 checks the pre-designated path for recent switch set updates, which are reloaded into the switch object data 114*a* for the user's installation of the present system. In this manner, changes on the network can be substantially transparent to the end user, thus providing streamlined access to various information sources. The network administrator may choose to password lock certain switches or all switches to facilitate this scheme.

Yet another potential application for the foregoing system is to facilitate access to various locations within the domain of an Internet content provider, such as MICROSOFT NETWORK, AOL or PRODIGY. In particular, by utilizing the dynamic switch configuration and locking capabilities of the system in combination with the update function, such a content provider can define various switches on mouse pad 100 to open various groups, locations, commerce offerings and other content areas within the content provider's domain. In such a case, the Internet content provider may choose to have indicia 500 and 501 be a name or other symbol associated with that company. Similarly, an Internet service provider may similarly use the foregoing system to assist users in logging into the Internet via their service rather than a competitive service.

The foregoing description and drawings are merely to explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A system for providing a user access to Internet web sites, the system comprising:

means for generating one or more unique predetermined inputs;

means for configuring one or more switch data records, each switch data record having a predetermined input and a set of one or more commands to be executed in response to the user inputting the predetermined input, a first one of the one or more switch data records being configured and dynamically locked to connect the user to an Internet web site via the Internet such that the first one of the one or more switch data are configurable by the user in association with an authorization mechanism;

means for receiving said predetermined input selected by the user, said predetermined input being associated with a selected one of the one or more switch data records; and means for executing said one or more commands stored in the selected switch data record.

2. The system of claim 1, wherein the authorization mechanism is a password.

3. The system of claim 1, wherein the means for receiving said predetermined input includes a plurality of buttons.

4. A method for providing a user access to Internet web sites the method comprising:

configuring one or more switch data records, each switch data record having a predetermined input and a set of one or more commands to be executed in response to the user inputting the predetermined input by activating a corresponding one of a plurality of buttons, a first one of the one or more switch data records being configured and dynamically locked to connect the user to a first Internet web site via the Internet such that the first one of the one or more switch data are configurable by the user in association with an authorization mechanism;

receiving said predetermined input selected, by the user, said predetermined input being associated with a selected one of the one or more switch data records; and executing said one or more commands stored in the selected switch data record.

5. The method of claim 4, further comprising:

obtaining authorization from the authorization mechanism;

reconfiguring the first one of the one or more switch data to connect the user to a second Internet web site.

6. The method of claim 4, wherein the step of obtaining authorization includes entering a password.

7. The method of claim 4, further comprising a step of identifying at least one of the plurality of buttons using an indicia including information associated with a business, the business being associated with the first Internet web site.

* * * * *